United States Patent
Fargeau

(10) Patent No.: US 8,750,945 B2
(45) Date of Patent: Jun. 10, 2014

(54) STANDALONE "HANDS-FREE" PHONE DEVICE, IN THE FORM OF A REMOVABLE SINGLE-PIECE OBJECT CLAMPED ON A SUN VISOR OF AN AUTOMOTIVE VEHICLE

(71) Applicant: Parrot, Paris (FR)

(72) Inventor: Karim Fargeau, Paris (FR)

(73) Assignee: Parrot, Paris (FR)

( * ) Notice: Subject to any disclaimer, the term of this patent is extended or adjusted under 35 U.S.C. 154(b) by 0 days.

(21) Appl. No.: 13/922,880

(22) Filed: Jun. 20, 2013

(65) Prior Publication Data

US 2014/0011550 A1    Jan. 9, 2014

(30) Foreign Application Priority Data

Jul. 4, 2012 (FR) .................. 12 56426

(51) Int. Cl.
*H04M 1/00* (2006.01)

(52) U.S. Cl.
USPC ............. 455/569.2; 455/90.3; 455/575.9; 379/454

(58) Field of Classification Search
CPC .............. H04M 1/6091; H04M 1/6075; B60R 11/0241; H04B 1/3877
USPC ............ 455/90.3, 550.1, 569.1, 569.2, 575.1, 455/575.9; 375/447, 454, 455
See application file for complete search history.

(56) References Cited

U.S. PATENT DOCUMENTS

| | | | |
|---|---|---|---|
| 6,625,426 B2* | 9/2003 | Baratono et al. | 455/569.2 |
| 7,266,204 B2* | 9/2007 | Watson et al. | 381/86 |
| 7,970,446 B2* | 6/2011 | Witkowski et al. | 455/575.9 |
| 8,082,009 B2* | 12/2011 | Baratono et al. | 455/569.1 |
| 8,200,214 B2* | 6/2012 | Chutorash et al. | 455/432.1 |

FOREIGN PATENT DOCUMENTS

DE    20 2006 013 765 U1    12/2006

OTHER PUBLICATIONS

GN Netcom: "Jabra Drive User Manuar", Dec. 31, 2011, XP002693018, URL: http://www.jabra.com/~media/Product%20Documentation/Jabra%20DRIVE/User%20Manuals/User_Manuar_Jabra_Drive.pdf, pp. 1-15.

* cited by examiner

*Primary Examiner* — Nhan Le
(74) *Attorney, Agent, or Firm* — Haverstock & Owens LLP

(57) ABSTRACT

The device (10) comprises a casing (12) accommodating a microphone (14), a sound reproduction transducer (16), a plurality of control buttons (18, 20, 22, 24), a printed board carrying electronic circuits, a power battery, as well as, possibly, operation indicators (26, 28), an external connector and a near-field communication antenna. The casing is in the form of an elongated band bended on itself in such a manner to form a clamp having laterally a U-shaped profile, a first branch (32) carrying the transducer and a second branch (34) carrying the microphone. The bended band has in the central region a transverse discontinuity (36) mechanically separating the two branches and acoustically decoupling the transducer and the microphone from each other.

10 Claims, 3 Drawing Sheets

STANDALONE "HANDS-FREE" PHONE DEVICE, IN THE FORM OF A REMOVABLE SINGLE-PIECE OBJECT CLAMPED ON A SUN VISOR OF AN AUTOMOTIVE VEHICLE

The invention relates to a standalone accessory of the "hands-free kit" type, intended to be interfaced to a portable phone, in particular on board an automotive vehicle.

Such an accessory is in the form of a standalone removable casing, comprising all the elements and controls for implementing "hands-free" functions, including microphone, loudspeaker and power battery, as well as means for interfacing with a remote portable phone, by a wireless link of the Bluetooth type (registered trademark of Bluetooth SIG, Inc.). The Bluetooth specifications indeed provide for the possibility to remotely pilot, via a two-directional wireless link, all the functions of a portable phone, such as off-hooking, on-hooking, dialing, browsing menus and directories, etc., by taking entirely and remotely the control of the portable phone by fully substituting for the keypad of the latter.

Such an accessory is described for example in the WO 2005/074239 A1 (Parrot).

With respect to the systems that are permanently integrated in the vehicle, the main advantage of such accessories is that they require no connection and can be installed (or removed) immediately by the user himself. The accessory may notably be installed in the vehicle by means of a clip for fixing it, for example, to a sun visor. Such an accessory is, for example, marketed by Parrot S A, Paris, France, under the reference Minikit or Minikit Slim: the device, which is fully standalone, is in the form of a simple casing including microphone, loudspeaker, control keys, a multifunction rotatable button, etc., and incorporates all the required electronic circuits, as well as a power battery.

The document of GN Netcom, *Jabra Drive User Manual*, XP002693018 dated Dec. 31, 2011., describes another of such accessories, with a single-piece casing bended into a U-shape, made of an elastic material allowing its clamping onto the vehicle sun visor as a clip, all the electronic circuits and components being grouped in the casing on one of the branches of the U.

The drawback of such standalone accessories, with respect to the "hands-free" systems that are permanently installed in the vehicle, lies in the proximity between the microphone and the loudspeaker, imposed by the necessity to have a small-size single-piece object. On the other hand, in a permanent installation, it is possible to provide one or several microphones whose position on the dash board is optimized, these microphones being in any case placed remote from the loudspeakers, which are generally those of the car radio and placed in the doors, under a console, etc.

The proximity between microphone and loudspeaker, combined with the relatively high distance between the microphone and the speaker (distance from the sun visor to the mouth of the driver) leads to a very high level of noise and echo. In particular, in the double-speech situations, where the driver and the remote speaker with whom he is in conversation both speak in the same time, the sound reproduced by the loudspeaker of the device will be picked up by the microphone, which is near, of this same device, with creation of echo and high acoustic interferences.

This drawback is all the more increased that, as it is not possible to know a priori where and when the device will be placed in the vehicle, it is necessary to use as integrated microphone a transducer having a very wide sensitivity pattern, so as to be certain that the voice of the speaker can be picked up. This omnidirectional-pattern microphone will have tendency to pick up a higher level of ambient noise, of resonances in the passenger compartment, of echo, etc., with high degradation of the signal/noise ratio.

For that reason, it is necessary to provide relatively complex algorithms of filtering and echo suppression, requiring a powerful microcontroller that put a strain on the final cost price of the product.

A solution proposed by the FR 2 961 052 A1 (Parrot) consists in providing a removable microphone, which may be detached and moved away from the device to be installed in a more appropriate place on the acoustic point of view. This solution however requires providing a wireless link between the microphone and the apparatus, as well as a means for fixing the offset microphone to the dashboard. Apart from the aesthetical aspects, those constraints take away from the apparatus a part of its interest, which lay in its possibility of immediate installation and removal.

Therefore, one object of the invention is to propose a standalone apparatus of the "hands-free kit" type that, in such circumstances, considerably improves the acoustic quality of the communication, while preserving the single-piece and standalone character of the object.

For that purpose, the invention proposes such a device that is, in manner known per se, for example by the above-mentioned document *Jabra Drive User Manual*, in the form of a casing accommodating a sound pick-up microphone sensor, a sound reproduction transducer, a plurality of control buttons, a printed board carrying electronic circuits, a power battery, as well as, possibly, operation indicators, an external connector and a near-field communication antenna. The casing is in the form of an elongated band bended on itself in such a manner to form a clamp having laterally a U-shaped profile, with a first branch and a second branch extending respectively on either side of a central region of greater curvature of the U.

The solution of the invention to the above-mentioned problem consists in providing in the central region of the bended band a transverse discontinuity mechanically separating the two branches, and in doing so that the transducer in carried by the first branch and the sensor is carried by the second branch. That way, the transducer and the sensor are acoustically decoupled from each other by the transverse discontinuity.

According to various subsidiary advantageous characteristics:

- the two branches of are rigid branches connected and articulated to each other in the central region by a transverse-axis hinge, such hinge being associated with means for elastic return of the two branches in the direction of their moving closer together;
- the first branch comprises an accommodation defining a closed volume receiving the transducer, wherein such volume can be closed by a lid with interposition of a circumferential seal: it is then possible to provide as a transducer a distributed-mode loudspeaker exciter, the first branch being planar and carrying a vibrant panel driven by the exciter;
- the sensor is placed in a region proximal to the outer face of the second branch, near the central region of greater curvature of the U;
- the sensor comprises a microphone capsule, itself accommodated in an intermediate support added on a wall of the second branch;
- one at least of the branches carries on its inner face a non-slip holding pad made of an acoustically absorbent resilient material;
- the length of the second branch is lower than that of the first branch;

the control buttons, the printed board and the operation indicators are carried by the first branch, whereas the near-field communication antenna is carried by the second branch.

An example of implementation of the invention will now be described, with reference to the appended drawings in which same reference numbers designate identical or functionally similar elements throughout the figures.

Figure 5:
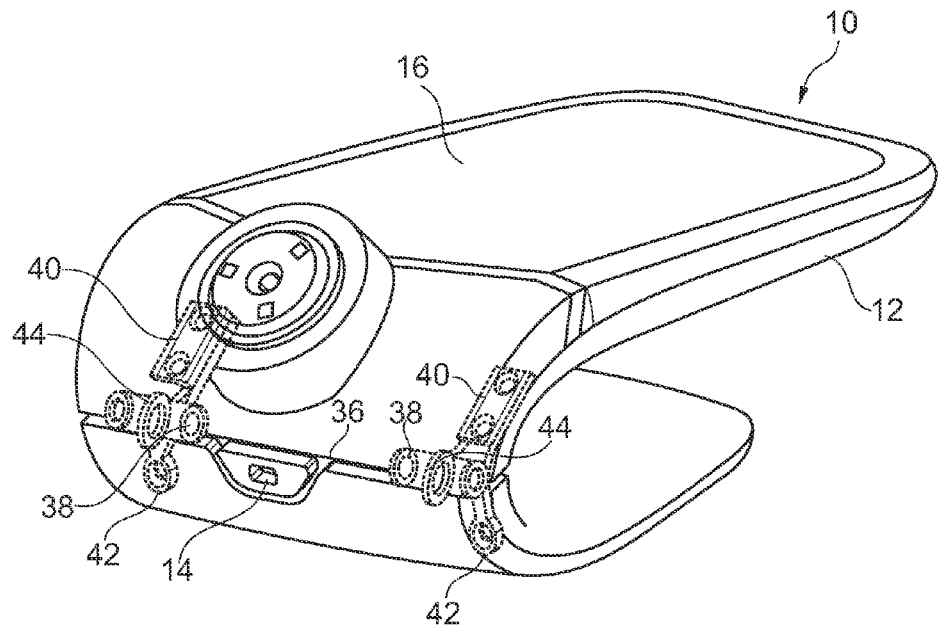

FIG. 5 a perspective view of the device, showing in transparency the system of articulations and springs connecting the two branches of the device.

Figure 6:
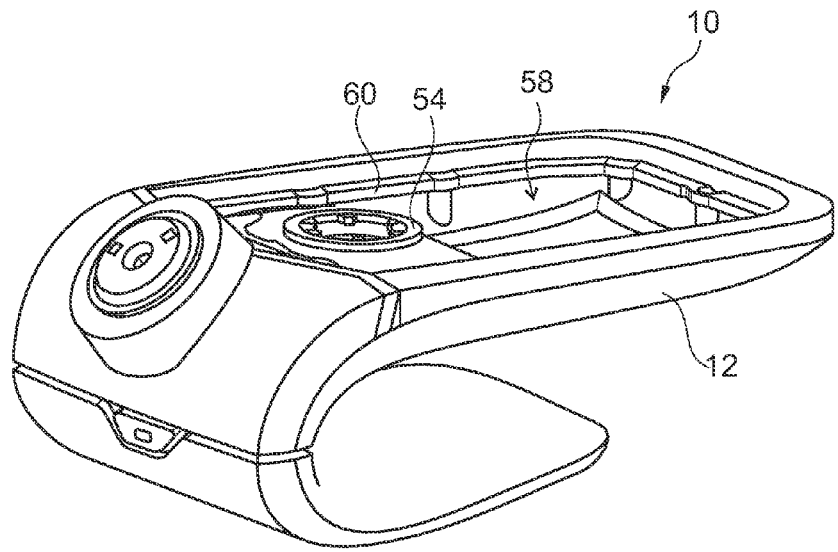

FIG. 6 is a perspective view of the device, with the upper panel removed to show how the sound reproduction transducer is integrated.

In the figures, the reference 10 generally designates the device of the invention, which is in the form of an articulated, standalone single-piece accessory (it will be seen how hereinafter), integrating all the components required for the implementation of a "hands-free" phone function.

More precisely, the casing 12 of the device comprises a sound pick-up microphone sensor 14 (hereinafter simply referred to as "microphone"), intended to collect the voice of the driver, a sound reproduction transducer 16 (hereinafter simply referred to as "transducer"), intended to reproduce the voice of the remote speaker with whom the driver is in conversation.

The device further comprises a certain number of controls available to the driver, with notably:

two phone control keys 18 and 20 (in particular for the off-hooking/dialing and the on-hooking/cancelling functions).

a multifunction rotatable button 36, which provides various controls according to the states of the device, for example: control of the volume of the transducer 16, browsing a menu, etc. This button 22 may be controlled not only by being rotated, by also as a push-button to "click" and control, for example, the acknowledgment of a function or a choice in a menu, the activation of a voice recognition mode, etc.;

a on/off/battery test switch 24;

red and green indicators 26, 28 activated as a function of the state of the device;

a connector (not visible on the figures) for charging the inner battery of the device.

Figure 1:
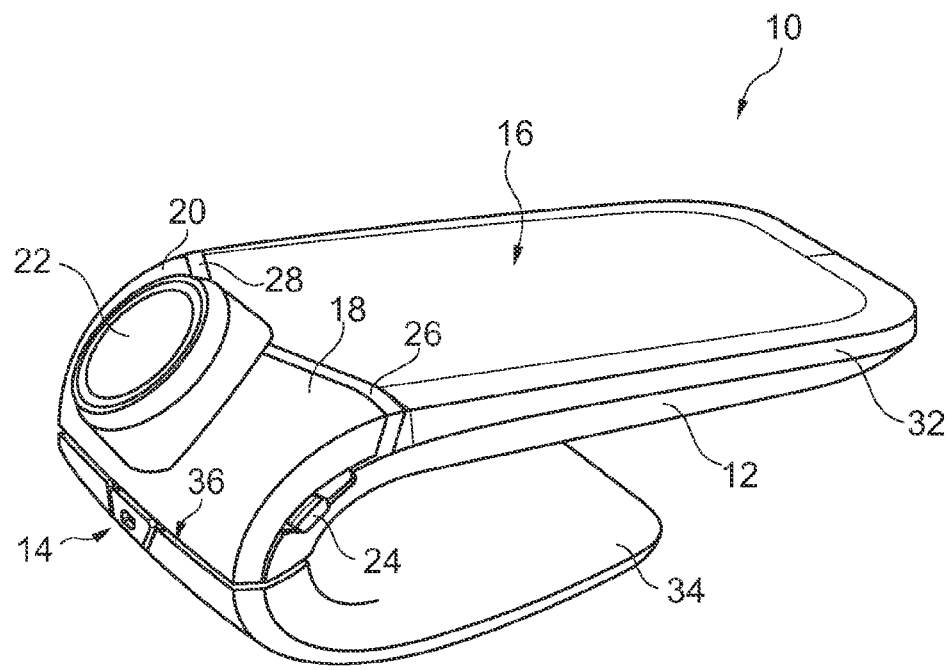
FIG. 1 is a general perspective view of the device of according to the invention.
Figure 2:
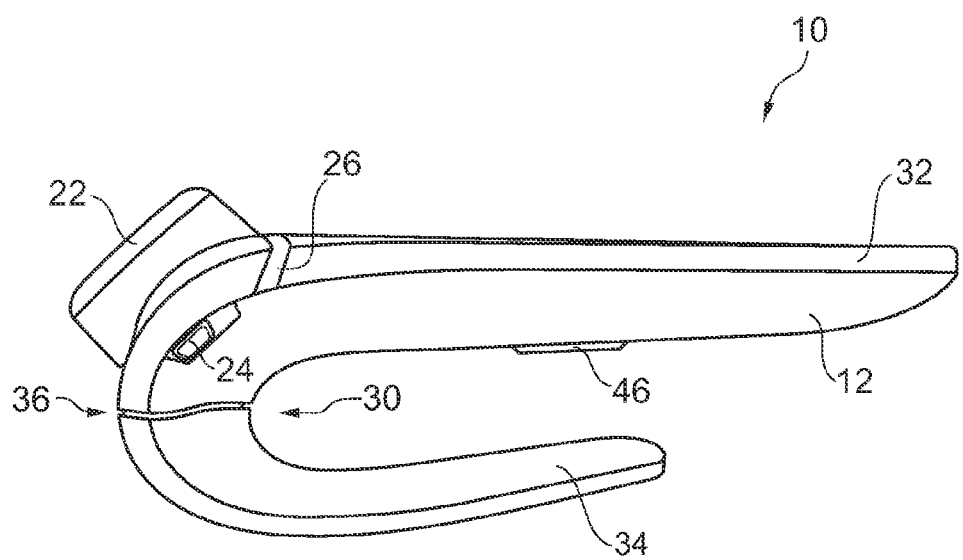
FIG. 2 is an elevation view of this same device.

Characteristically of the invention, the casing 12 is made in the form of an elongated band bended on itself in such a manner to have laterally (see in particular FIGS. 2 and 4) a U-shaped profile on either side of a central region 30 of greater curvature, thus defining two branches 32, 34 extending on either side of the central region 30.

The first branch 32, which is intended to be turned toward the driver, carries the transducer 16 as well as all the controls 20 to 28 described hereinabove, grouped on an edge of the upper branch in the proximal region of the latter (i.e. near the central region 30). This allows providing on the visible, outer face of the first branch 32 a planar surface of relatively great extend (the major part of the length of the first branch 32 and almost all its width). This allows in particular using as a transducer a component of the distributed-mode loudspeaker type, implementing a vibrant panel consisted by the essential of the planar, outer surface of the first branch.

The second branch 34 carries the microphone 14, arranged near the central region 30, so as to remain visible even when the device is installed on a sun visor (the major part of the second branch 34 being then not visible because it is hidden behind the sun visor, opposite said first branch 32).

Characteristically of the invention, the body of the casing 12 has, in 36, a transverse discontinuity 36, such discontinuity being a peripheral discontinuity formed in the wall of the casing 12, over all the width and the sides thereof. The device is thus in the form of two parts mechanically connected to each other, but separated from each other, one of which carrying the first branch 32 and the other the second branch 34.

FIG. 5 more particularly illustrates how these two parts are connected and articulated to each other. It is provided for that purpose inside the casing two transversal-axis hinges 38, each of which is fixed in 40 and 42, respectively, to the part of the casing carrying the first branch and to that carrying the second branch. These hinges 38 (arranged in the illustrated example at the two opposite ends of the transverse discontinuity 36) are associated with elastic return means, for example springs 44 biasing the two parts of the casing in the direction of a moving together of the two branches.

The device may then behaves as an articulated clamp allowing the holding thereof on the sun visor, notably if the two branches are provided with an appropriate shape: in particular, at the clamped state (corresponding to the illustration of FIG. 2), the interval separating the two branches 32 and 34 is more reduced in the distal region than in the proximal region, so as to accentuate the clamping effect. In other words, in the maximum closing configuration, the two branches are not parallel, but the ends thereof are slightly close to each other. The holding on the sun visor may further be reinforced by providing on the inner face of the first branch 32 a non-slip holding pad 46, located substantially opposite the distal end of the second branch 34 (which is provided a little shorter than the first branch 32).

The travel of the articulation and the respective geometry of the two branches are chosen so that the device can fit onto the sun visors of almost all the automotive vehicles, and the inner faces of the two branches 32 and 34 are approximately planar, so as to fit at best onto the planar faces of a sun visor. In the example shown, the branches 32, 34 are rigid branches, articulated to each other, but it might also be contemplated to give, notably to the second branch 34, a proper elasticity participating to the function of clamping onto the sun visor.

Characteristically of the invention, the presence of the transverse discontinuity 36 creates an acoustic decoupling between the microphone 14 and the transducer 16, these two members being acoustically separated from each other by the discontinuity 36 that inhibits, or at least reduces in very high proportions, the transmission toward the microphone 14 of the vibrations produced in the casing 12 by the transducer 16.

Figure 4:
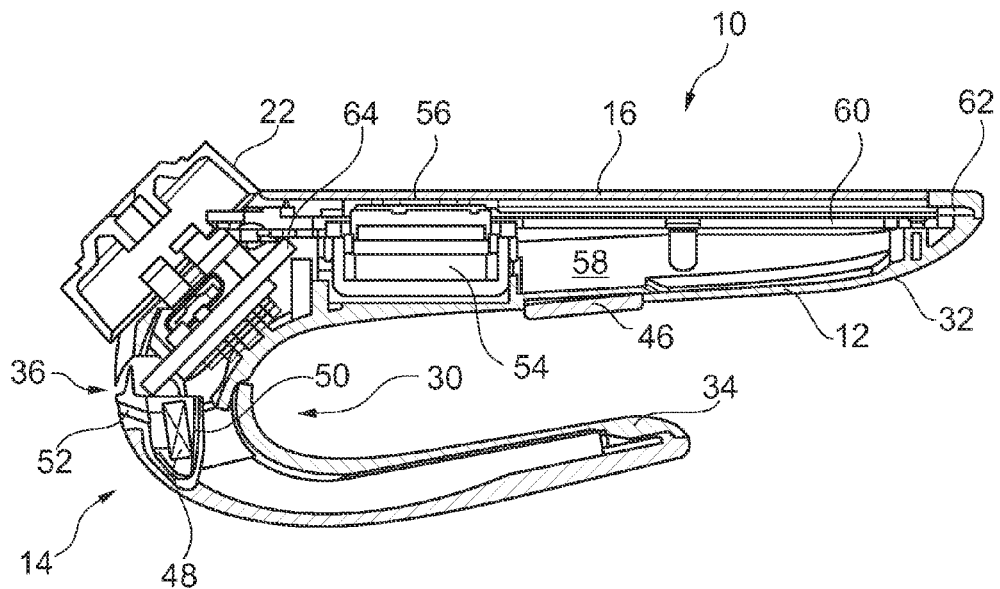
FIG. 4 is a sectional elevation view of the device.

FIG. 4 shows more precisely how the microphone 14 is made up and mounted in the lower part of the casing (the part that carries the second branch 34).

The microphone 14 is formed of a microphone capsule 48 accommodated in an intermediate support 50 that communicates with the outside through a channel 52, this support being added on a wall of the casing, for example by screwing. This configuration with an intermediate casing allows obtaining an additional level of decoupling between the sensor itself (the capsule 48) and the body of the casing, in addition to the decoupling permitted by the transverse discontinuity 36. The microphone is preferably of the omnidirectional type, so as to be able to suitably pick up the speech of the driver from the region where this microphone is located, near the central region 30 of the U, when the device 10 is clamped on the sun visor.

Figure 3:
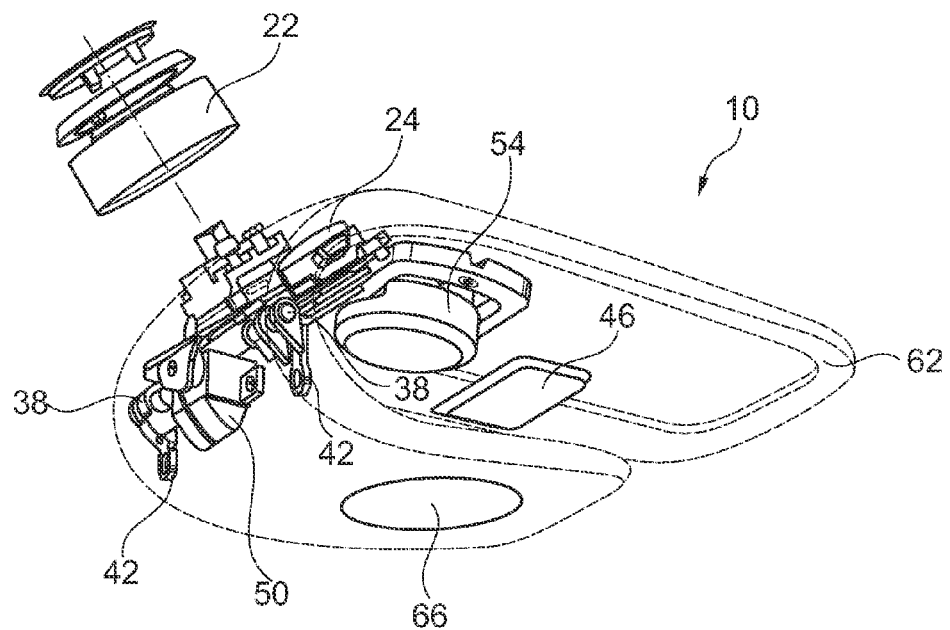
FIG. 3 is a partially-exploded transparent view showing in particular the elements contained inside the casing of the device.

FIGS. 3, 4 and 6 show more precisely the configuration of the sound reproduction transducer 16.

As indicated hereinabove, this transducer is advantageously of the distributed-mode loudspeaker type, with an exciter 54 shown in the upper part of the casing 12 (the part carrying the first branch 32), coupled in 56 to the vibrant panel 16 turned toward the driver producing the sound vibrations. To optimize this mounting from the acoustic point of view, the exciter 54 is arranged inside an accommodation 58 of the upper part of the casing 12, defining a closed volume, which is closed by the mounting of a closing lid carrying the vibrant panel 16 against a peripheral edge 60 with interposition of a peripheral O-ring 62, so as to inhibits any air leak from the cavity of the accommodation 58, then providing an additional level of decoupling between the transducer and the microphone.

As regards the acoustical aspects, it will be noted besides that the non-slip holding pad 46 is advantageously made of an acoustically absorbent resilient material, so as to prevent the casing 12 of the device from vibrating, if it is mounted on a rigid sun visor, thus participating to the improvement of the whole acoustic solution.

As regards the electronic elements, the upper part of the casing 12 carries the printed circuit board 64 carrying all the electronic circuits and the various controls and operation indicators, as well as the battery (not shown), wherein all the electric and electronic elements, except the microphone, can thus be grouped in this same upper part of the casing.

If the device is equipped with an inductive near-field communication system of the NFC type, the NFC antenna 66 may be arranged in the lower branch of the casing. Indeed, as the communication is a communication at a distance of a few centimeters, it is not cumbersome to locate it a this place; on the other hand, on the efficiency point of view, the latter will be better if this antenna is remote from the magnetic elements of the exciter 54 of the transducer.

As regards the acoustic performances, with respect to the prior model Minikit Slim mentioned in the introduction part of the present description, the device according to the invention allows without difficulty to increase by about 50% the acoustic power delivered by the transducer without thereby disturbing the signal picked up by the microphone, and this with a device whose length is reduced by about 50%, and thus with a far more compact configuration. Moreover, these performances are obtained with a substantial qualitative improvement of the acoustic signal picked up by the microphone, despite the increase of the acoustic power of the transducer.

The invention claimed is:

1. A phone device for "hands-free" interfacing with a portable phone, said device (10) being in the form of a single-piece accessory adapted to be removably fastened by being clamped onto a planar equipment of an automotive vehicle, in particular a sun visor, said device comprising a casing (12) accommodating: a sound pick-up microphone sensor (14); a sound reproduction transducer (54, 16); a plurality of control buttons (18, 20, 22, 24); a printed board (64) carrying electronic circuits; and a power battery; as well as, possibly, operation indicators (26, 28), an external connector and a near-field communication antenna (66), wherein the casing is in the form of an elongated band bended on itself in such a manner to form a clamp having laterally a U-shaped profile, with a first branch (32) and a second branch (34) extending respectively on either side of a central region of greater curvature of the U (30), said device being characterized in that:

the bended band has in the central region a transverse discontinuity (36) mechanically separating the two branches; and the transducer is carried by the first branch and the sensor is carried by the second branch, so that the transducer and the sensor are acoustically decoupled between each other by said transverse discontinuity.

2. The device of claim 1, wherein the two branches are rigid branches connected and articulated to each other in the central region by a transverse-axis hinge (38), said hinge being associated with means (44) for elastic return of the two branches in the direction of their moving closer together.

3. The device of claim 1, wherein the first branch comprises an accommodation (58) defining a closed volume receiving the transducer.

4. The device of claim 3, wherein the closed volume is closed by a lid with interposition of a circumferential seal (62).

5. The device of claim 3, wherein the transducer is a distributed-mode loudspeaker exciter (54), the first branch being planar and carrying a vibrant panel (16) driven by the exciter.

6. The device of claim 1, wherein the sensor is placed in a region proximal to the outer face of the second branch, near the central region of greater curvature of the U.

7. The device of claim 1, wherein the sensor comprises a microphone capsule (48), itself accommodated in an intermediate support (50) added on a wall of the second branch.

8. The device of claim 1, wherein one at least of the branches carries on its inner face a non-slip holding pad (46) made of an acoustically absorbent resilient material.

9. The device of claim 1, wherein the length of the second branch is lower than that of the first branch.

10. The device of claim 1, wherein the control buttons, the printed board and the operation indicators are carried by the first branch, whereas the near-field communication antenna is carried by the second branch.

\* \* \* \* \*